(12) United States Patent
Namekawa et al.

(10) Patent No.: US 12,032,208 B2
(45) Date of Patent: Jul. 9, 2024

(54) OPTICAL CONNECTOR AND OPTICAL CONNECTOR MANUFACTURING METHOD

(71) Applicant: Orbray Co., Ltd., Tokyo (JP)

(72) Inventors: Tsuyoshi Namekawa, Tokyo (JP); Hiroyuki Fujiwara, Tokyo (JP); Masaru Sasaki, Tokyo (JP); Tsutomu Okamoto, Tokyo (JP)

(73) Assignee: Orbray Co., Ltd., Tokyo (JP)

( * ) Notice: Subject to any disclaimer, the term of this patent is extended or adjusted under 35 U.S.C. 154(b) by 317 days.

(21) Appl. No.: 17/493,337

(22) Filed: Oct. 4, 2021

(65) Prior Publication Data
US 2022/0026639 A1    Jan. 27, 2022

Related U.S. Application Data

(63) Continuation of application No. PCT/JP2020/016140, filed on Apr. 10, 2020.

(30) Foreign Application Priority Data

Apr. 11, 2019   (JP) ................................ 2019-075287

(51) Int. Cl.
*G02B 6/26*        (2006.01)
(52) U.S. Cl.
CPC .................................. *G02B 6/262* (2013.01)
(58) Field of Classification Search
None
See application file for complete search history.

(56) References Cited

U.S. PATENT DOCUMENTS

| 7,949,219 | B1* | 5/2011 | Karras ..................... G02B 6/26 |
| | | | 385/50 |
| 10,234,644 | B1 | 3/2019 | Butler et al. |
| 10,551,566 | B2* | 2/2020 | Amb ........................ G02B 1/04 |
| 10,684,419 | B2* | 6/2020 | Fortusini .................. G02B 6/13 |

(Continued)

FOREIGN PATENT DOCUMENTS

| JP | 2007-178602 A | 7/2007 |
| JP | 5571855 B2 | 8/2014 |

(Continued)

OTHER PUBLICATIONS

International Search Report (IDS) dated Jun. 23, 2020 filed in PCT/JP2020/016140.

*Primary Examiner* — Rhonda S Peace
(74) *Attorney, Agent, or Firm* — RANKIN, HILL & CLARK LLP

(57) ABSTRACT

An optical connector includes multiple optical fibers; a single multicore fiber; and multiple self-forming optical waveguides, wherein the total number of cores of the multiple optical fibers and the total number of cores of the multicore fiber are identical to each other, the multiple optical fibers and the multicore fiber are arranged facing each other, the self-forming optical waveguides are provided among the multiple optical fibers and the multicore fiber, end portions of the self-forming optical waveguides are optically connected to the cores of the multiple optical fibers and the cores of the multicore fiber, and either the multiple optical fibers or the multicore fiber contacting the end portions of the self-forming optical waveguides is detachable from the self-forming optical waveguides.

16 Claims, 3 Drawing Sheets

(56) References Cited

U.S. PATENT DOCUMENTS

| | | | |
|---|---|---|---|
| 2016/0349455 A1 | 12/2016 | Amb et al. | |
| 2018/0024295 A1* | 1/2018 | Missinne | G02B 6/3616 385/38 |
| 2022/0026639 A1* | 1/2022 | Namekawa | G02B 6/02042 |
| 2022/0057579 A1* | 2/2022 | Namekawa | G02B 6/262 |

FOREIGN PATENT DOCUMENTS

| | | |
|---|---|---|
| JP | 2017-507357 A | 3/2017 |
| WO | 2013/051656 A1 | 4/2013 |

\* cited by examiner

OPTICAL CONNECTOR AND OPTICAL CONNECTOR MANUFACTURING METHOD

CROSS-REFERENCE TO RELATED APPLICATION

The present application is a continuation application of International Application No. PCT/JP2020/016140, filed on Apr. 10, 2020, which claims priority to Japanese Patent Application No. 2019-075287, filed on Apr. 11, 2019. The contents of these applications are incorporated herein by reference in their entirety.

BACKGROUND

1. Technical Field

One aspect of the present disclosure relates to an optical connector and an optical connector manufacturing method.

2. Related Art

As an optical fiber, an optical fiber having a single core in a clad as shown in FIG. 6(a) of Japanese Patent No. 5571855 has been used. Meanwhile, a multicore fiber shown in FIG. 6(b) of Japanese Patent No. 5571855 has been also proposed. The multicore fiber has multiple (four cores or more, about 19 cores) cores in the clad. In the multicore fiber, a mass of information can propagate in each core at once.

In order for a mass of information to propagate in the multicore fiber at once, the technique of separately optically connecting light emitted from each core of a multicore fiber having seven cores to each core of seven single-mode optical fibers as in FIG. 7 of Japanese Patent No. 5571855 has been used. However, it is difficult to optically connect the single-mode optical fiber to each core of the multicore fiber. A reason therefor is as follows. That is, the outer diameter of the multicore fiber is 150 µm to 240 µm, the diameter of the core is 10 µm, and a core gap is 40 µm to 50 µm. On the other hand, the outer diameter of the single-mode optical fiber is 125 µm, and the diameter of the core is 10 µm. As described above, the size of the single-mode optical fiber is extremely smaller than that of the multicore fiber, and for this reason, it is difficult to optically connect these optical fibers. Thus, the technique of optically connecting these optical fibers is disclosed in Japanese Patent No. 5571855.

An optical connector described in Japanese Patent No. 5571855 is an optical connector for a multicore fiber, and optically connects, in one-to-one correspondence, the light emitted from the cores of the multicore fiber to the cores of the same number of single-mode optical fibers as that of the cores of the multicore fiber. In this optical connector, the multicore fiber is inserted into and fixed in an insertion hole provided on one side of a quartz glass molded article. Further, the single-mode optical fibers are each inserted into and fixed in multiple insertion holes provided on the other side of the quartz glass molded article. In addition, a guide hole for guiding the single-mode optical fiber to the core of the multicore fiber is provided on an extension of each single-mode optical fiber insertion hole. Polymer is charged into these guide holes, and in this manner, optical waveguides are formed. With the optical waveguides, the cores of the multicore fiber are each optically connected to the cores of the single-mode optical fibers.

SUMMARY

An optical connector includes multiple optical fibers; a single multicore fiber; and multiple self-forming optical waveguides, wherein the total number of cores of the multiple optical fibers and the total number of cores of the multicore fiber are identical to each other, the multiple optical fibers and the multicore fiber are arranged facing each other, the self-forming optical waveguides are provided among the multiple optical fibers and the multicore fiber, end portions of the self-forming optical waveguides are optically connected to the cores of the multiple optical fibers and the cores of the multicore fiber, and either the multiple optical fibers or the multicore fiber contacting the end portions of the self-forming optical waveguides is detachable from the self-forming optical waveguides.

DETAILED DESCRIPTION

Figure 1:
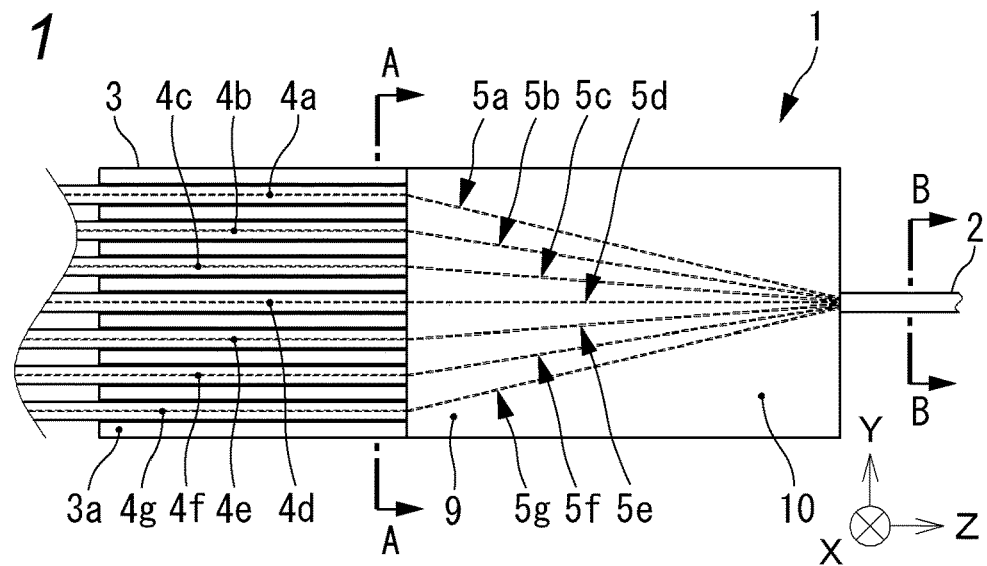
FIG. 1 is a schematic view for describing an optical connector according to an embodiment of the present disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

However, when the multiple single-mode optical fibers are actually arrayed, it is difficult to eliminate a variation in the angle of the core of each optical fiber in an axial direction. Further, it is also difficult to eliminate a variation in a core gap between adjacent ones of the optical fibers.

Moreover, it is also difficult to eliminate a variation in the angle of each core of the multicore fiber in the axial direction, and it is also difficult to eliminate a variation in the core gap of the multicore fiber.

Thus, when the optical connector described in Japanese Patent No. 5571855 is to be actually achieved, even a little variation as described above is caused on the single-mode optical fiber side and the multicore fiber side. For this reason, when an attempt is made to connect the core of a single-mode optical fiber and each core of a multicore fiber to through the optical waveguides made of, e.g., the polymer, there is a probability that an optical waveguide is erroneously formed in connection with an adjacent core due to the above-described variations.

Thus, even upon use of the optical waveguides made of, e.g., the polymer, a high accuracy is required for the array of the multiple single-mode optical fibers and formation of each core of the multicore fiber. For this reason, a high accuracy is required for manufacturing of the optical connector. As a result, a manufacturing cost increases, and the yield of the optical connector is degraded.

One object of the present disclosure is to provide an optical connector including a multicore fiber and being capable of achieving reduction in a manufacturing cost and improvement in the yield of the optical connector and the method for manufacturing such an optical connector.

An optical connector (the present optical connector) according to one aspect of the present disclosure includes multiple optical fibers; a single multicore fiber; and multiple self-forming optical waveguides, wherein the total number of cores of the multiple optical fibers and the total number of cores of the multicore fiber are identical to each other, the multiple optical fibers and the multicore fiber are arranged facing each other, the self-forming optical waveguides are provided among the multiple optical fibers and the multicore fiber, end portions of the self-forming optical waveguides are optically connected to the cores of the multiple optical fibers and the cores of the multicore fiber, and either the multiple optical fibers or the multicore fiber contacting the end portions of the self-forming optical waveguides is detachable from the self-forming optical waveguides.

An optical connector manufacturing method (the present manufacturing method) according to one aspect of the present disclosure includes preparing multiple optical fibers, a multicore fiber, and photo-curing resin; confirming that the total number of cores of the multiple optical fibers and the total number of cores of the multicore fiber are identical to each other; arranging the multiple optical fibers and the multicore fiber such that the multiple optical fibers and the multicore fiber face each other and arranging the photo-curing resin among the multiple optical fibers and the multicore fiber; curing end portions of the photo-curing resin with a core gap by incident light entering the end portions of the photo-curing resin from the multiple optical fibers and the multicore fiber, thereby transferring the core gap onto the photo-curing resin and forming the multiple self-forming optical waveguides at the photo-curing resin; forming a clad by curing of the photo-curing resin; detaching either the multiple optical fibers or the multicore fiber from the self-forming optical waveguides; and optically connecting, to the self-forming optical waveguides, multiple optical fibers or a multicore fiber different from the detached multiple optical fibers or multicore fiber.

According to the present optical connector and the present manufacturing method, either the multiple optical fibers or the multicore fiber can be detached from the self-forming optical waveguides. With this configuration, the scope of the use application of the optical connector can be expanded.

Further, the detached multiple optical fibers or multicore fiber can be, as a master component, repeatedly used for the step of manufacturing another optical connector. The highly-accurate multiple optical fibers or multicore fiber with smaller various variations is detached and repeatedly used, and therefore, the self-forming optical waveguides can be manufactured with highly-accurate constant core gaps in the multiple optical fibers or the multicore fiber detached from the end portions of the self-forming optical waveguides. Thus, a connection loss of the optical connector can be easily reduced, and reduction in the cost for manufacturing the optical connector and improvement in the yield of the optical connector can be achieved.

The optical connector according to the first aspect of the present embodiment includes multiple optical fibers; a single multicore fiber; and multiple self-forming optical waveguides, wherein the total number of cores of the multiple optical fibers and the total number of cores of the multicore fiber are identical to each other, the multiple optical fibers and the multicore fiber are arranged facing each other, the self-forming optical waveguides are provided among the multiple optical fibers and the multicore fiber, end portions of the self-forming optical waveguides are optically connected to the cores of the multiple optical fibers and the cores of the multicore fiber, and either the multiple optical fibers or the multicore fiber contacting the end portions of the self-forming optical waveguides is detachable from the self-forming optical waveguides.

According to this configuration, either the multiple optical fibers or the multicore fiber can be detached from the self-forming optical waveguides. With this configuration, the scope of the use application of the optical connector can be expanded.

The optical connector manufacturing method of the second aspect of the present disclosure includes preparing multiple optical fibers, a multicore fiber, and photo-curing resin; confirming that the total number of cores of the multiple optical fibers and the total number of cores of the multicore fiber are identical to each other; arranging the multiple optical fibers and the multicore fiber such that the multiple optical fibers and the multicore fiber face each other and arranging the photo-curing resin among the multiple optical fibers and the multicore fiber; curing end portions of the photo-curing resin with a core gap by incident light entering the end portions of the photo-curing resin from the multiple optical fibers and the multicore fiber, thereby transferring the core gap onto the photo-curing resin and forming the multiple self-forming optical waveguides at the photo-curing resin; forming a clad by curing of the photo-curing resin; detaching either the multiple optical fibers or the multicore fiber from the self-forming optical waveguides; and optically connecting, to the self-forming optical waveguides, multiple optical fibers or a multicore fiber different from the detached multiple optical fibers or multicore fiber.

In addition to the above effects, according to the manufacturing methods, the detached multiple optical fibers or multicore fiber can be, as a master component, repeatedly used for the step of manufacturing another optical connector. The highly-accurate multiple optical fibers or multicore fiber with smaller various variations is detached and repeatedly used, and therefore, the self-forming optical waveguides can be manufactured with highly-accurate constant core gaps in the multiple optical fibers or the multicore fiber detached from the end portions of the self-forming optical waveguides. Thus, a connection loss of the optical connector can be easily reduced, and reduction in the cost for manufacturing the optical connector and improvement in the yield of the optical connector can be achieved.

An optical connector according to a third aspect of the present embodiment is that in the optical connector of the first aspect, an optical fiber array including the multiple optical fibers arrayed in a linear shape in array grooves formed on a surface of an array substrate is provided and the cores of the multicore fiber are arrayed in an optional non-linear shape.

An optical connector manufacturing method according to a fourth aspect of the present embodiment is that the optical connector manufacturing method of the second aspect further includes forming an optical fiber array in such a manner that the multiple optical fibers are arrayed in a linear shape in array grooves formed on a surface of an array substrate and arraying the cores of the multicore fiber in an optional non-linear shape.

According to these configuration and manufacturing method, in the optical fiber array, the multiple optical fibers are arrayed in the linear shape. Further, the cores of the multicore fiber are arrayed in the optional non-linear shape.

Thus, manufacturing of any of these components is facilitated, and manufacturing of the optical connector is also facilitated.

An optical connector according to a fifth aspect of the present embodiment is that in the optical connector of the first aspect, arrangement of the cores of the multiple optical fibers and arrangement of the cores of the multicore fiber are the same as each other.

An optical connector manufacturing method according to a sixth aspect of the present embodiment is that the optical connector manufacturing method of the second aspect further includes arranging the cores of the multiple optical fibers in the same manner as arrangement of the cores of the multicore fiber.

According to these configuration and manufacturing method, upon formation of the self-forming optical waveguides, crossing of adjacent ones of the self-forming optical waveguides can be reduced. Accordingly, optical connection between adjacent ones of the self-forming optical waveguides can be reduced. Consequently, the connection loss of the optical connector can be easily reduced.

An optical connector according to a seventh aspect of the present embodiment is that in the optical connector of any of the first, third, or fifth aspects, a mold release agent is applied to the multiple optical fibers or the multicore fiber detachable from the self-forming optical waveguides.

An optical connector manufacturing method according to an eighth aspect of the present embodiment is that the optical connector manufacturing method of any of the second, fourth, and sixth aspects further includes applying, in advance, a mold release agent to the multiple optical fibers or the multicore fiber detached from the self-forming optical waveguides.

According to these configuration and manufacturing method, by application of the mold release agent, the multiple optical fibers or the multicore fiber can be smoothly detached from the self-forming optical waveguides while loss of the end portions of the self-forming optical waveguides upon detachment of the multiple optical fibers or the multicore fiber is reduced.

Hereinafter, an embodiment according to the present disclosure will be described with reference to FIGS. 1 to 3 and FIGS. 7A to 7C. Note that X-axis, Y-axis, and Z-axis directions of each figure are common among the figures.

An optical connector 1 of the present embodiment includes multiple (seven) optical fibers 4a to 4g, a single multicore fiber 2, and multiple self-forming optical waveguides (hereinafter referred to as optical waveguides 5a to 5g). The optical fibers 4a to 4g are each arrayed in a linear shape in array grooves 3b formed on a surface of a single array substrate 3a. In this manner, an optical fiber array 3 is formed. That is, the optical connector 1 includes the optical fiber array 3 having the optical fibers 4a to 4g each arrayed in the linear shape in the array grooves 3b formed on the surface of the single array substrate 3a. Note that the Z-axis of each figure is in a direction parallel with a longitudinal direction of the multicore fiber 2 and a longitudinal direction of each optical fiber 4a to 4g. The X-axis and the Y-axis directions are the directions perpendicular to the Z-axis direction.

Each optical fiber 4a to 4g is of a type that a clad surrounds a core, is a single mode or a multimode, and is any of a step index fiber or a graded index fiber. The core is indicated by a dashed line in FIGS. 1 and 7A to 7C, and is indicated by a solid line in FIG. 2. Further, each optical fiber 4a to 4g is made of glass or plastic. The outer diameter of the clad is 0.125 mm (125 μm) in the case of the single-mode optical fiber. Note that the mode field diameter of a single-mode fiber with a band of 1550 nm is 10.5 μm.

Figure 3:
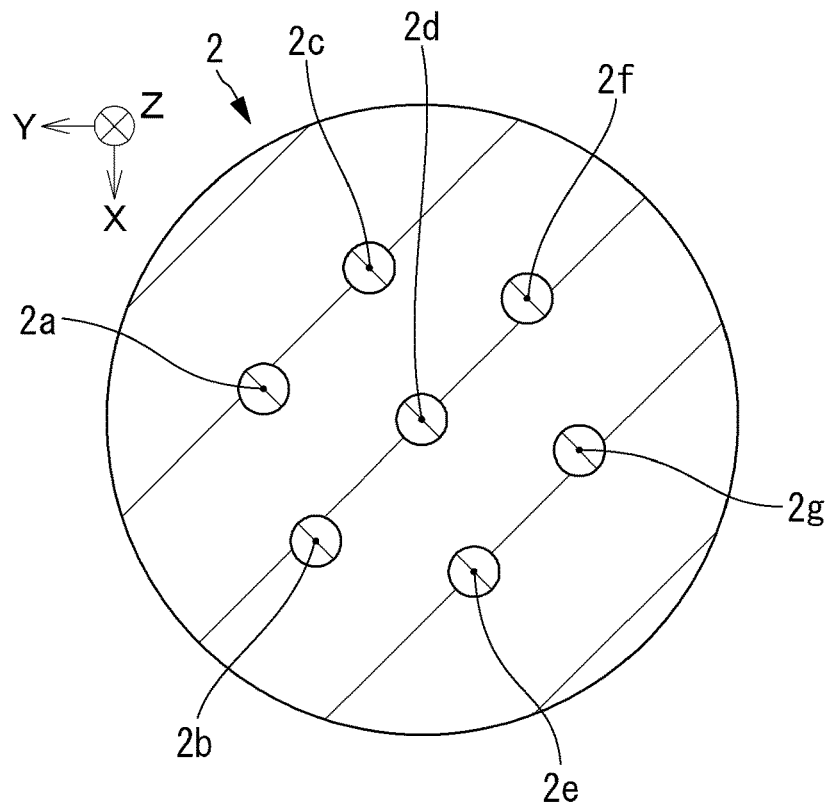
FIG. 3 is a sectional view along a B-B line of FIG. 1.

In the multicore fiber 2, a core diameter is about 9 μm, a clad diameter is 125 μm, and the number of cores is a plural number (seven including 2a to 2g in FIG. 3). Further, as one example, a cutoff wavelength is 1190 nm to 1500 nm, and a mode field diameter is 4.8 μm to 5.6 μm (a propagating light wavelength of 1310 nm) or 5.7 μm to 8.5 μm (a propagating light wavelength of 1550 nm). Moreover, each core can be arrayed as necessary. Examples of the type of core array include an array in a single line, an array in a square shape as a non-linear shape, an array in two lines, and an array in which a single core is arranged at the center and six cores are arranged at equal angles and gaps at the vertices of a regular hexagon as shown in FIG. 3. Each core gap is 35 μm to 50 μm.

In the multicore fiber 2, each core 2a to 2g is preferably positioned and arranged such that the formed optical waveguides 5a to 5g do not overlap with each other in the direction of at least one of three axes including the X-axis, the Y-axis, and the Z-axis, considering reduction in unintended core connection among the optical fibers 4a to 4g and the multicore fiber 2. In FIG. 3, in the Y-axis direction, the core 2c and the core 2f are arranged to partially overlap with each other, the core 2a, the core 2d, and the core 2g are arranged to partially overlap with each other, and the core 2b and the core 2e are arranged to partially overlap with each other. However, the cores 2a to 2g are positioned not to overlap with each other in the X-axis direction and the Z-axis direction.

The optical waveguides 5a to 5g are formed in a container 10. A clad 9 is formed around the optical waveguides 5a to 5g, and is also housed in the container 10. The clad 9 can be formed in, e.g., a circular columnar shape, a rectangular columnar shape, or other three-dimensional shapes according to the inner surface shape of the container 10. Note that in the present embodiment, the dimension of the container 10 in the Z-axis direction is 3.1 mm.

The container 10 is formed in a hollow three-dimensional shape forming an outer surface shape of the clad 9. Moreover, it may only be required that the material of the container 10 is a hard material such as metal, hard synthetic resin, ceramic, or glass, for example. The container 10 is provided with, e.g., a window or an opening through which ultraviolet light (UV) penetrates, as necessary.

End portions of the optical fibers 4a to 4g are arranged on one end side of the container 10. Moreover, an end portion of the multicore fiber 2 is arranged on the other end side of the container 10. Further, at the container 10, a not-shown opening for charging photo-curing resin forming each optical waveguide 5a to 5g and the clad 9 is provided.

The total number of cores of the optical fibers 4a to 4g and the total number of cores 2a to 2g of the multicore fiber 2 are set to the same number. The optical fibers 4a to 4g and the multicore fiber 2 are arranged facing each other. The optical waveguides 5a to 5g are linearly provided among the cores of the optical fibers 4a to 4g and the cores 2a to 2g of the multicore fiber 2. Thus, both end sides of the optical waveguides 5a to 5g in the Z-axis direction are optically connected to the cores of the optical fibers 4a to 4g and the cores 2a to 2g of the multicore fiber 2.

Note that in the present embodiment, even when there is a difference in height in the X-axis direction between each optical fiber 4a to 4g and the multicore fiber 2, if the optical waveguides 5a to 5g are formed among the cores of the optical fibers 4a to 4g and the cores 2a to 2g of the multicore fiber 2, such a state is taken as each optical fiber 4a to 4g and the multicore fiber 2 being arranged facing each other.

Figure 2:
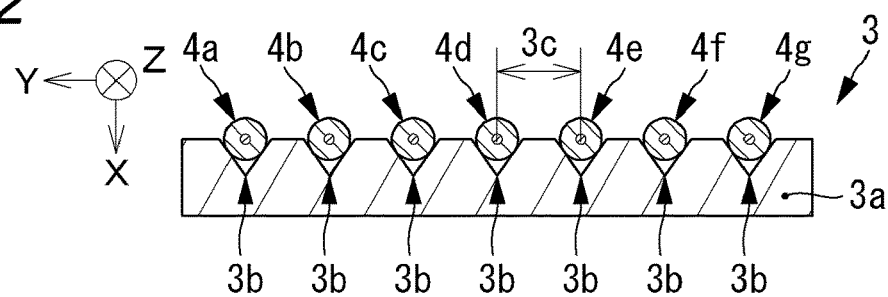
FIG. 2 is a sectional view along an A-A line of FIG. 1.

As shown in FIGS. 1 to 3, the optical fibers 4a to 4g are arrayed in a linear array shape, and on the other hand, the cores 2a to 2g of the multicore fiber 2 are radially formed with the difference in height in the X-axis direction. Thus, the optical waveguides 5a to 5g formed linearly are, among the optical fibers 4a to 4g and the cores 2a to 2g of the multicore fiber 2, also optically connected to the optical fibers 4a to 4g and the cores 2a to 2g of the multicore fiber 2 with the difference in height in the X-axis direction. Specifically, the optical fiber 4a, the optical fiber 4b, the optical fiber 4c, the optical fiber 4d, the optical fiber 4e, the optical fiber 4f, and the optical fiber 4g are each connected respectively to the core 2a, the core 2b, the core 2c, the core 2d, the core 2e, the core 2f, and the core 2g.

Further, after connection, detachment from the optical connector 1 is allowed in such a manner that either the optical fibers 4a to 4g or the multicore fiber 2 is detached from the optical waveguides 5a to 5g.

Figure 7A:
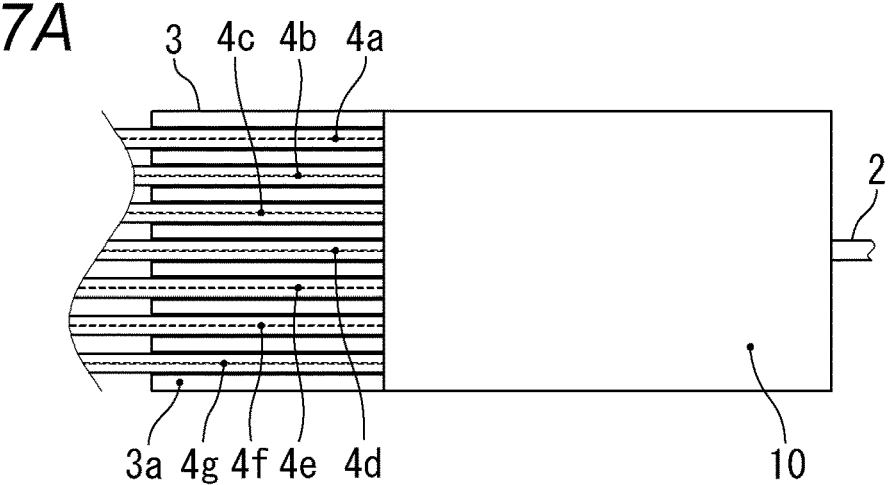
FIGS. 7A to 7C are partial sectional views schematically showing the method for manufacturing the optical connector of FIG. 1.

Next, the method for manufacturing the optical connector 1 will be described with reference to FIGS. 7A to 7C. First, as shown in FIG. 7A, the optical fiber array 3 in which the optical fibers 4a to 4g are arrayed, the multicore fiber 2, and the photo-curing resin are prepared as shown in FIG. 7A. The photo-curing resin is prepared in such a manner that the photo-curing resin is charged into the container 10 through the above-described opening. The photo-curing resin is charged into the container 10, and accordingly, is arranged among the optical fibers 4a to 4g and the multicore fiber 2.

The photo-curing resin is of a clad selective polymerization type. The material of the photo-curing resin is a solution containing a liquid mixture of two or more types of monomer and a photopolymerization initiator added to such a liquid mixture. The photo-curing resin is polymerized and cured into polymer by incident light with such a wavelength band that the photopolymerization initiator has a sensitivity.

Next, it is confirmed whether or not the total number of cores of the optical fibers 4a to 4g and the total number of the cores 2a to 2g of the multicore fiber 2 are the same as each other. In an example shown in FIGS. 7A to 7C, it is confirmed that each of these numbers is seven and the total numbers are the same as each other. Further, the optical fibers 4a to 4g and the multicore fiber 2 are arranged facing each other, and the photo-curing resin is arranged among the optical fibers 4a to 4g and the multicore fiber 2. Note that the optical fibers 4a to 4g and the multicore fiber 2 may be arranged facing each other in such a manner that the optical fibers 4a to 4g and the multicore fiber 2 are arranged at both ends of the container 10 after the photo-curing resin has been charged into the container 10.

Figure 7B:
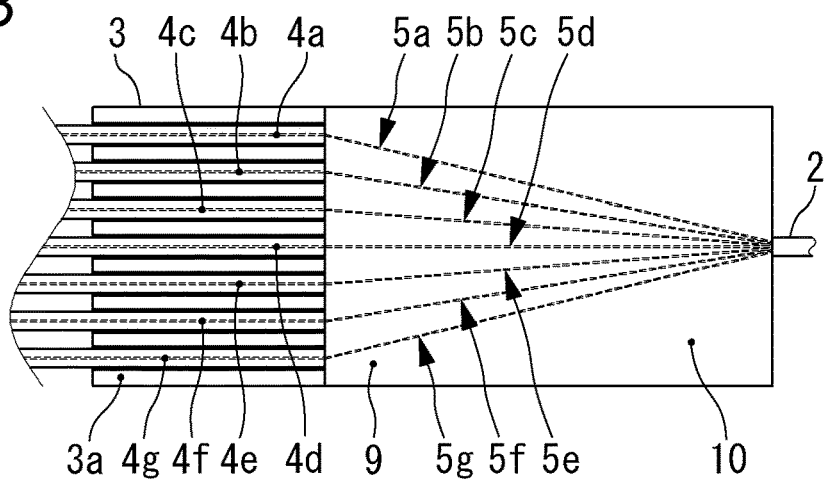
Figure 7C:
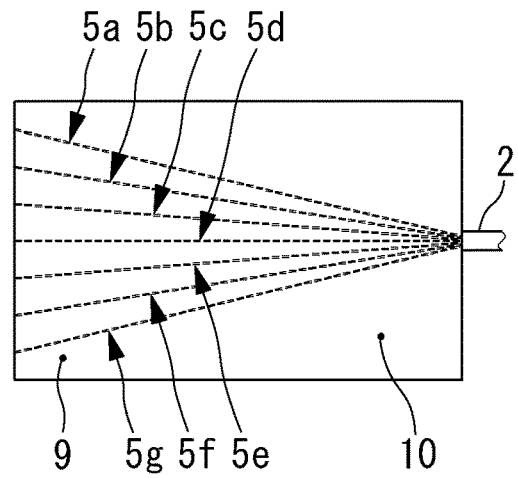

Next, as shown in FIG. 7B, the light enters end portions of the photo-curing resin from each optical fiber 4a to 4g and the multicore fiber 2. Accordingly, the end portions of the photo-curing resin are polymerized and cured with a core gap between adjacent ones of the multiple optical fibers 4a to 4g and the core gap of the multicore fiber 2. By such polymerization curing, each of the above-described core gaps is transferred onto the end portions of the photo-curing resin.

The wavelength $\lambda w$ of the light for polymerizing and curing the photo-curing resin can be set as necessary according to the photopolymerization initiator. The wavelength of such light is, as one example, 365 nm to 1675 nm.

After transfer, the light continuously enters the photo-curing resin from the optical fibers 4a to 4g and the multicore fiber 2. Accordingly, the multiple optical waveguides 5a to 5g are formed at the photo-curing resin. The core diameter of each optical waveguide 5a to 5g is preferably the same as the core diameter of each optical fiber 4a to 4g, and is preferably uniform along an optical axis direction of each optical waveguide 5a to 5g. The mode field diameter of each optical waveguide 5a to 5g is the same (10.5 μm) as that of the single-mode fiber.

Next, the clad 9 is formed. The clad 9 is of a clad selective polymerization type. In each optical waveguide 5a to 5g, at least one type of monomer is in polymerization reaction with the wavelength $\lambda w$. As a result, in the cured core region, a non-polymerization-reacted monomer component is, at the same level of concentration as that in the liquid mixture, dispersed as unreacted monomer. At the same time, only one type of monomer is consumed and polymerized in the core region. Thus, at a boundary surface between the core and the clad, a monomer concentration gradient is caused, and interdiffusion progresses. Accordingly, the function of the clad can be obtained. Finally, the entirety of the photo-curing resin is irradiated with ultraviolet light (UV irradiation), and accordingly, the cores and the entirety of the clad 9 are cured and formed and the optical waveguides 5a to 5g are obtained.

Next, either the optical fibers 4a to 4g or the multicore fiber 2 is detached from the optical waveguides 5a to 5g, and accordingly, is detached from the optical connector 1. According to the use application of the optical connector 1, it is determined whether the optical fiber array 3 or the multicore fiber 2 is to be detached.

Further, not-shown optical fibers or a not-shown multi-core fiber different from the detached optical fibers 4a to 4g or multicore fiber 2 is optically connected to the optical waveguides 5a to 5g again. As these different optical fibers or multicore fiber, those satisfying the position accuracy of the specifications of the optical connector 1 are employed.

As described above, in the optical connector 1, the optical fibers 4a to 4g or the multicore fiber 2 can be detached from the optical waveguides 5a to 5g. That is, either the multiple optical fibers 4a to 4g or the multicore fiber 2 can be detached from the optical waveguides 5a to 5g. With this configuration, the scope of the use application of the optical connector 1 can be expanded.

The optical fibers 4a to 4g or the multicore fiber 2 can be detached from the optical waveguides 5a to 5g in such a manner that a mold release agent is, in advance, applied to an outer portion of each optical fiber 4a 4g or an outer portion of the multicore fiber 2 contacting end portions of the optical waveguides 5a to 5g. In the case of FIGS. 7A to 7C, the mold release agent is applied to the end portions of the optical fiber array 3 and each optical fiber 4a to 4g in advance. In the case of detaching the multicore fiber 2, the mold release agent is applied to the end portion of the multicore fiber 2 in advance. With the applied mold release agent, the optical fibers 4a to 4g or the multicore fiber 2 can be smoothly detached from the optical waveguides 5a to 5g while loss of the end portions of the optical waveguides 5a to 5g upon detachment of the optical fibers 4a to 4g or the multicore fiber 2 is reduced.

The detached optical fibers 4a to 4g or multicore fiber 2 can be, as a master component, repeatedly used for the step of manufacturing another optical connector. The highly-accurate optical fibers 4a to 4g or multicore fiber 2 with smaller various variations is detached and repeatedly used, and therefore, other optical waveguides 5a to 5g can be manufactured with highly-accurate constant core gaps in the optical fibers 4a to 4g or the multicore fiber 2 detached from the end portions of the optical waveguides 5a to 5g. Thus, a connection loss of the optical connector 1 can be easily reduced, and reduction in the cost for manufacturing the optical connector 1 and improvement in the yield of the optical connector 1 can be achieved.

Further, according to the optical connector 1, the seven optical fibers 4a to 4g are arrayed in the linear shape in the optical fiber array 3. On the other hand, in the multicore fiber 2, the cores 2a to 2g are arrayed in the optional non-linear shape. That is, one of the cores 2a to 2g is arranged at the center, and the other cores are arrayed about such a core at equal angles and gaps. Thus, the waste of an array space can be reduced. Consequently, any of the optical fiber array 3 and the multicore fiber 2 is easily manufactured, and manufacturing of the optical connector 1 is also facilitated.

Note that the optical fibers 4a to 4g may be arranged on a not-shown multicore ferrule instead of the array substrate 3a.

Upon formation of the optical waveguides 5a to 5g, the optical fiber 4a, the optical fiber 4b, the optical fiber 4c, the optical fiber 4d, the optical fiber 4e, the optical fiber 4f, and the optical fiber 4g are each connected respectively to the core 2a, the core 2b, the core 2c, the core 2d, the core 2e, the core 2f, and the core 2g. Thus, the light enters the photo-curing resin from the cores of the optical fibers 4a, 4b, 4c, 4d, 4e, 4f, 4g and the cores 2a, 2b, 2c, 2d, 2e, 2f, 2g of the multicore fiber 2 in this order. Accordingly, the optical waveguides are formed in the order of 5a, 5b, 5c, 5d, 5e, 5f, and 5g. Thus, unintended optical waveguide formation among the optical fibers and the cores of the multicore fiber 2 can be reduced.

Figure 4:
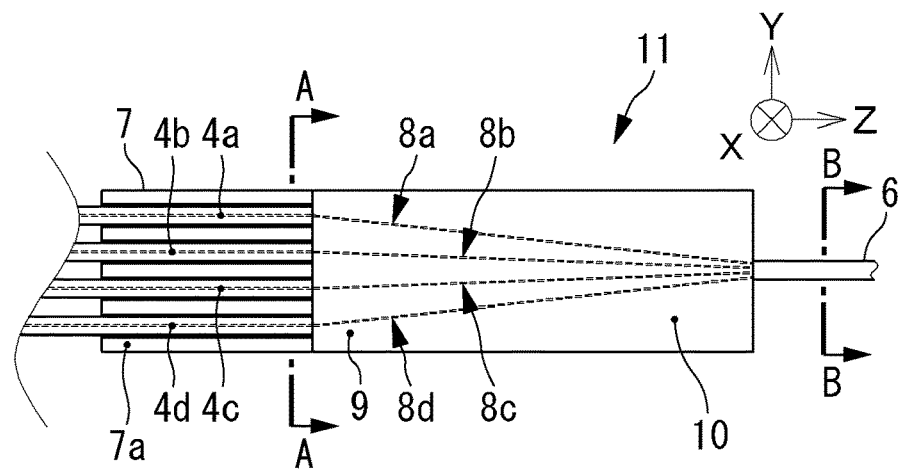
FIG. 4 is a schematic view for describing an optical connector of a modification example of the embodiment according to the present disclosure.

Next, a modification example of the embodiment according to the present disclosure will be described with reference to FIGS. 4 to 6. The X-axis, Y-axis, and the Z-axis directions of each figure are common among the figures. A difference of an optical connector 11 of the modification example from the optical connector 1 is that arrangement of cores of multiple optical fibers 4a to 4d is the same as arrangement of cores 6a to 6d of a multicore fiber 6.

The optical connector 11 includes the optical fibers 4a to 4d, the multicore fiber 6, and self-forming optical waveguides 8a to 8d. The optical fibers 4a to 4d are each arrayed in array grooves 7b on a surface of an array substrate 7a. With this configuration, an optical fiber array 7 in a linear shape in the Y-axis direction is formed. Note that the Z-axis of each figure is in a direction parallel with a longitudinal direction of the multicore fiber 6 and a longitudinal direction of each optical fiber 4a to 4d. The X-axis and Y-axis directions are the directions perpendicular to the Z-axis direction.

Figure 6:
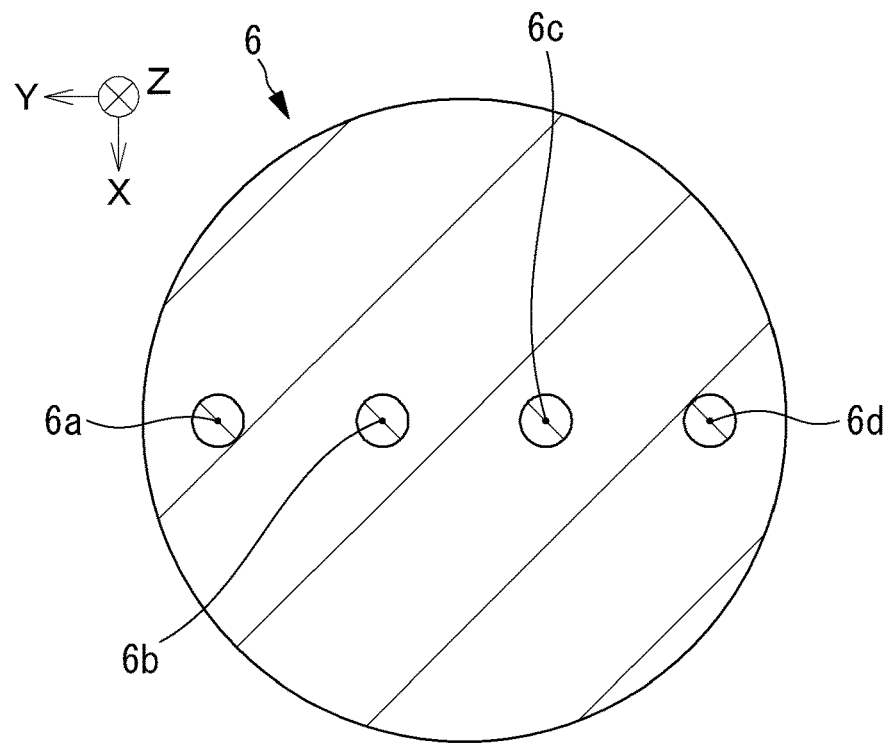
FIG. 6 is a sectional view along a B-B line of FIG. 4.

Differences of the multicore fiber 6 from the multicore fiber 2 are that the multicore fiber 6 has the four cores 6a to 6d (the number of cores is four) and the cores 6a to 6d are arrayed in a core arrangement state, i.e., in the linear shape in the Y-axis direction as shown in FIG. 6. The optical fiber 4a, the optical fiber 4b, the optical fiber 4c, and the optical fiber 4d are each connected respectively to the core 6a, the core 6b, the core 6c, and the core 6d. Thus, light enters photo-curing resin from the cores of the optical fibers 4a, 4b, 4c, 4d and the cores 6a, 6b, 6c, 6d of the multicore fiber 6 in this order. Accordingly, the optical waveguides are formed in the order of 8a, 8b, 8c, and 8d.

Figure 5:
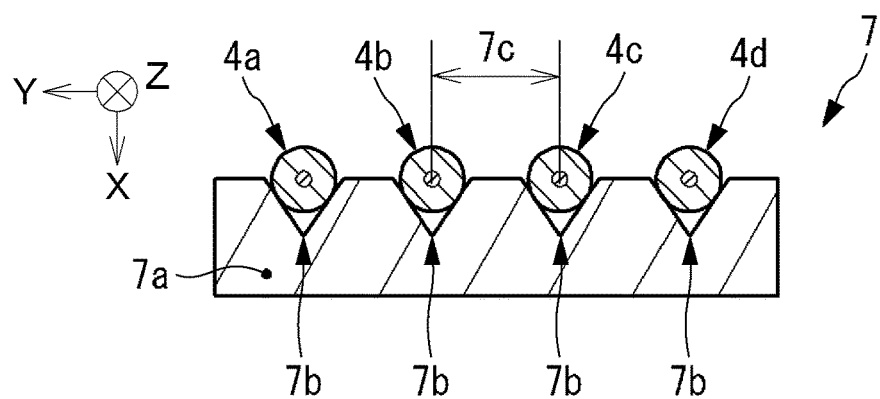
FIG. 5 is a sectional view along an A-A line of FIG. 4.

As shown in FIGS. 5 and 6, the number of cores of the optical fibers 4a to 4d and the number of cores of the multicore fiber 6 are the same as each other, i.e., are both four, and the cores are arrayed in the linear shape in the Y-axis direction. Thus, arrangement of the cores of the optical fibers 4a to 4d and arrangement of the cores 6a to 6d of the multicore fiber 6 are the same as each other. Thus, upon formation of the optical waveguides 8a to 8d, crossing of adjacent ones of the optical waveguides can be reduced. Accordingly, optical connection between adjacent ones of the optical waveguides can be reduced. Consequently, a connection loss of the optical connector 11 can be easily reduced.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. An optical connector comprising:
   multiple optical fibers;
   a single multicore fiber; and
   multiple self-forming optical waveguides,
   wherein the total number of cores of the multiple optical fibers and the total number of cores of the multicore fiber are identical to each other,
   the multiple optical fibers and the multicore fiber are arranged facing each other,
   the self-forming optical waveguides are provided among the multiple optical fibers and the multicore fiber,
   end portions of the self-forming optical waveguides are optically connected to the cores of the multiple optical fibers and the cores of the multicore fiber,
   either the multiple optical fibers or the multicore fiber contacting the end portions of the self-forming optical waveguides is detachable from the self-forming optical waveguides,
   the cores of the multicore fiber are arrayed in a non-linear shape, and
   the cores of the multicore fiber are positioned such that the cores of the multicore fiber partially overlap with each other in a first direction perpendicular to a second direction which is a direction parallel with a longitudinal direction of the multicore fiber and not overlap with each other in the second direction and a third direction perpendicular to the first direction and the second direction.

2. The optical connector according to claim 1, wherein an optical fiber array including the multiple optical fibers arrayed in a linear shape in array grooves formed on a surface of an array substrate is provided.

3. The optical connector according to claim 2, wherein a mold release agent is applied to the multiple optical fibers or the multicore fiber detachable from the self-forming optical waveguides.

4. The optical connector according to claim 1, wherein a mold release agent is applied to the multiple optical fibers or the multicore fiber detachable from the self-forming optical waveguides.

5. The optical connector according to claim 1, wherein an outer diameter of a clad of each one of the multiple optical fibers is identical to an outer diameter of a clad of the multicore fiber.

6. An optical connector manufacturing method comprising:

preparing multiple optical fibers, a multicore fiber, and photo-curing resin;
confirming that the total number of cores of the multiple optical fibers and the total number of cores of the multicore fiber are identical to each other;
arranging the multiple optical fibers and the multicore fiber such that the multiple optical fibers and the multicore fiber face each other and arranging the photo-curing resin among the multiple optical fibers and the multicore fiber;
curing end portions of the photo-curing resin with a core gap by incident light entering the end portions of the photo-curing resin from the multiple optical fibers and the multicore fiber, thereby transferring the core gap onto the photo-curing resin and forming the multiple self-forming optical waveguides at the photo-curing resin;
forming a clad by curing of the photo-curing resin;
detaching either the multiple optical fibers or the multicore fiber from the self-forming optical waveguides; and
optically connecting, to the self-forming optical waveguides, multiple optical fibers or a multicore fiber different from the detached multiple optical fibers or multicore fiber,
wherein the cores of the multicore fiber are arrayed in a non-linear shape, and
the cores of the multicore fiber are positioned such that the cores of the multicore fiber partially overlap with each other in a first direction perpendicular to a second direction which is a direction parallel with a longitudinal direction of the multicore fiber and not overlap with each other in the second direction and a third direction perpendicular to the first direction and the second direction.

7. The optical connector manufacturing method according to claim 6, further comprising:
forming an optical fiber array in such a manner that the multiple optical fibers are arrayed in a linear shape in array grooves formed on a surface of an array substrate.

8. The optical connector manufacturing method according to claim 7, further comprising:
applying, in advance, a mold release agent to the multiple optical fibers or the multicore fiber detached from the self-forming optical waveguides.

9. The optical connector manufacturing method according to claim 6, further comprising:
applying, in advance, a mold release agent to the multiple optical fibers or the multicore fiber detached from the self-forming optical waveguides.

10. The optical connector manufacturing method according to claim 6, wherein
an outer diameter of a clad of each one of the multiple optical fibers is identical to an outer diameter of a clad of the multicore fiber.

11. An optical connector manufacturing method comprising:
preparing multiple optical fibers, a multicore fiber, and photo-curing resin;
confirming that the total number of cores of the multiple optical fibers and the total number of cores of the multicore fiber are identical to each other;
arranging the multiple optical fibers and the multicore fiber such that the multiple optical fibers and the multicore fiber face each other and arranging the photo-curing resin among the multiple optical fibers and the multicore fiber;
curing end portions of the photo-curing resin with a core gap by incident light entering the end portions of the photo-curing resin from the multiple optical fibers and the multicore fiber, thereby transferring the core gap onto the photo-curing resin and forming the multiple self-forming optical waveguides at the photo-curing resin;
forming a clad by curing of the photo-curing resin;
detaching either the multiple optical fibers or the multicore fiber from the self-forming optical waveguides; and
optically connecting, to the self-forming optical waveguides, multiple optical fibers or a multicore fiber different from the detached multiple optical fibers or multicore fiber,
wherein the multiple optical fibers include a first optical fiber and a second optical fiber,
the multicore fiber includes a first core and a second core,
in the curing the end portions of the photo-curing resin, the light is irradiated such that the light enters the photo-curing resin from the core of the first optical fiber and the first core of the multicore fiber, thereby forming the self-forming optical waveguide connecting the first optical fiber and the first core of the multicore fiber, and then the light is irradiated such that the light enters the photo-curing resin from the core of the second optical fiber and the second core of the multicore fiber, thereby forming the self-forming optical waveguide connecting the second optical fiber and the second core of the multicore fiber.

12. The optical connector manufacturing method according to claim 11, further comprising:
forming an optical fiber array in such a manner that the multiple optical fibers are arrayed in a linear shape in array grooves formed on a surface of an array substrate; and
arraying the cores of the multicore fiber in a non-linear shape.

13. The optical connector manufacturing method according to claim 12, further comprising:
applying, in advance, a mold release agent to the multiple optical fibers or the multicore fiber detached from the self-forming optical waveguides.

14. The optical connector manufacturing method according to claim 11, further comprising:
applying, in advance, a mold release agent to the multiple optical fibers or the multicore fiber detached from the self-forming optical waveguides.

15. The optical connector manufacturing method according to claim 11, further comprising:
arranging the cores of the multiple optical fibers in a manner identical to arrangement of the cores of the multicore fiber.

16. The optical connector manufacturing method according to claim 15, further comprising:
applying, in advance, a mold release agent to the multiple optical fibers or the multicore fiber detached from the self-forming optical waveguides.

* * * * *